July 31, 1962  G. H. HANSON  3,047,486
NUCLEAR REACTOR

Filed April 7, 1958   3 Sheets-Sheet 1

INVENTOR.
George H. Hanson
BY Hudson & Young
ATTORNEYS

July 31, 1962 G. H. HANSON 3,047,486
NUCLEAR REACTOR

Filed April 7, 1958 3 Sheets-Sheet 2

INVENTOR.
George H. Hanson
BY Hudson & Young
ATTORNEYS

July 31, 1962 G. H. HANSON 3,047,486
NUCLEAR REACTOR

Filed April 7, 1958 3 Sheets-Sheet 3

INVENTOR.
George H. Hanson
BY Hudson & Young
ATTORNEYS

United States Patent Office 3,047,486
Patented July 31, 1962

3,047,486
NUCLEAR REACTOR
George H. Hanson, Idaho Falls, Idaho, assignor to Phillips Petroleum Company, a corporation of Delaware
Filed Apr. 7, 1958, Ser. No. 726,796
5 Claims. (Cl. 204—193.2)

This invention relates to nuclear reactors.

It is known that substantial amounts of heat can be produced in controlled reactors which utilize nuclear fission. In such reactors, a neutron fissionable isotope, such as $U^{235}$, is subjected to fission by the absorption of neutrons. A self-sustaining chain reaction is established by the neutrons which evolve from the fission. In general, nuclear reactors comprise members containing such materials which are disposed in close proximity to materials which slow the neutrons to thermal energies. Such a neutron slowing material is referred to as a moderator. Carbon, beryllium and other materials are typical moderators for use in nuclear reactors. A substantial amount of heat is generated by such reactions, and this heat is removed by the circulation of a suitable coolant in thermal contact with the fissionable elements. This heat can be employed for useful purposes.

In accordance with the present invention, there is provided a novel nuclear reactor which employs rotating plates which contain fissionable material. These plates are mounted with respect to one another so that there is an overlapping of sections of the plates at a common location. The composition of the plates and the positions of the plates are such that a self-sustaining reaction takes place in the overlapped region. Due to the heat capacity of the fuel plates, a substantial amount of heat is carried by the rotating plates out of the overlapped area. A suitable coolant is circulated in heat exchange relationship with the plates to remove the generated heat. In this manner, it is possible to provide a generator wherein the heat of fission can efficiently be removed.

Accordingly, it is an object of this invention to provide a novel nuclear reactor which is capable of generating high temperatures.

Another object is to provide a nuclear reactor with efficient heat exchange between the fissionable fuel elements and the reactor coolant.

A further object is to provide a novel nuclear power plant of relatively small size which can readily be controlled.

Other objects, advantages and features of this invention should become apparent from the following detailed description which is taken in conjunction with the accompanying drawing in which.

Figure 1:
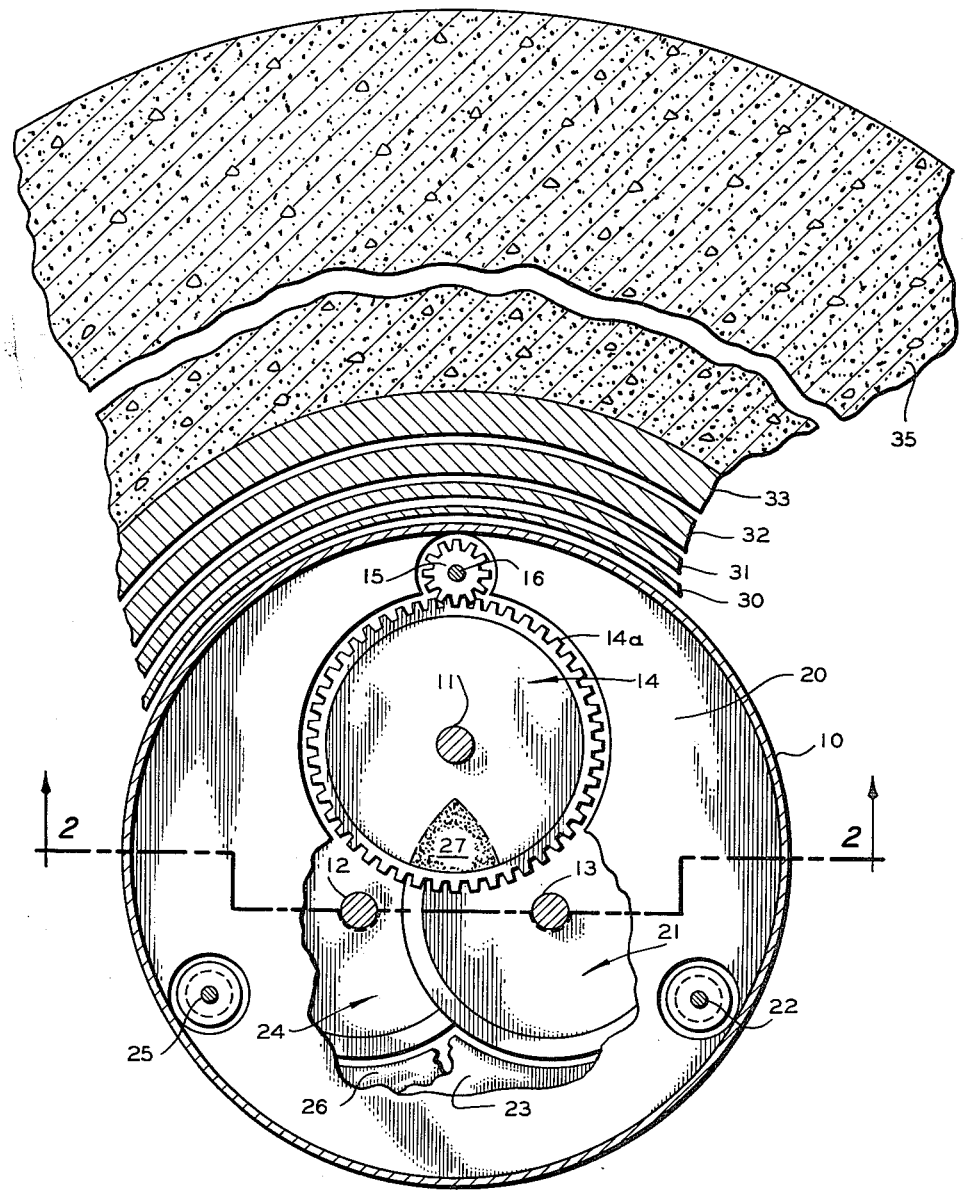
FIGURE 1 is a view, shown partially in section, of the nuclear reactor of this invention.
Figure 2:
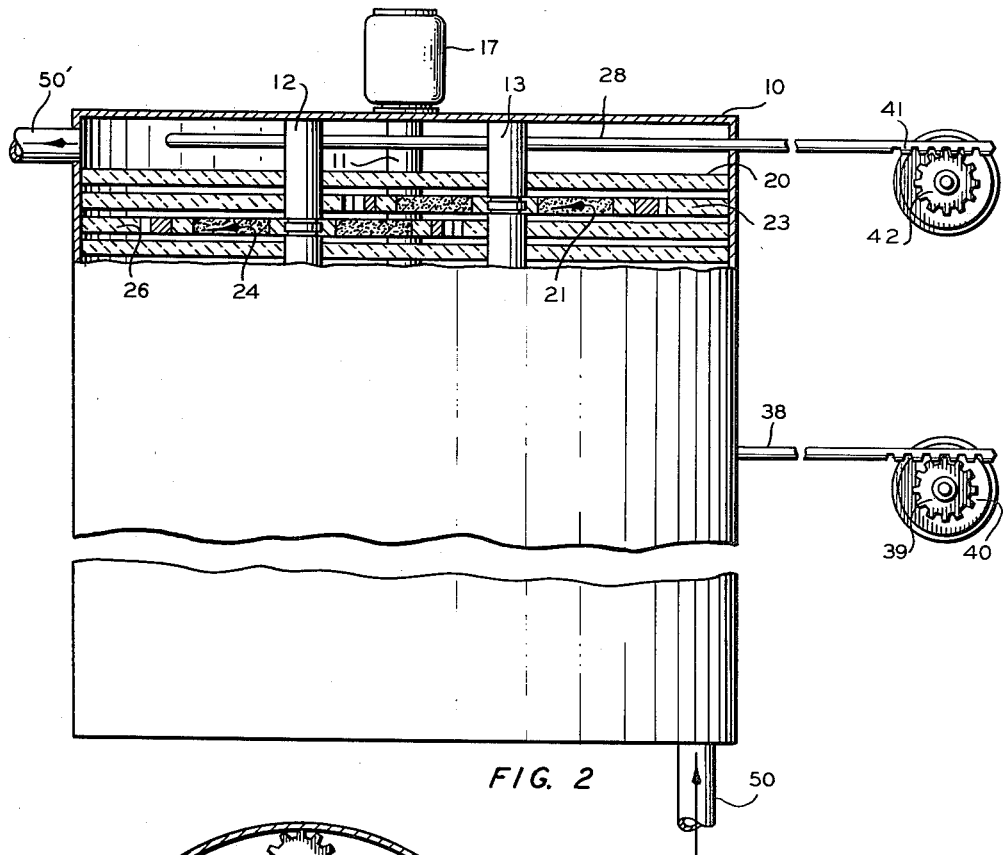
FIGURE 2 is a view taken along line 2—2 in FIGURE 1.

Referring now to the drawing in detail and to FIGURES 1 and 2 in particular, there is shown a metal housing 10 which contains the reactor fuel plates, moderator plates and control plates that form the nuclear reactor of this invention. Three supports rods 11, 12 and 13 extend vertically through the reactor and are spaced from one another so as to form an equilateral triangle in a horizontal cross-section, as shown in FIGURE 1. A first fuel plate 14 is positioned in the upper region of housing 10 so as to be free to rotate about rod 11. The edge of fuel plate 14 forms a spur gear 14a which meshes with a spur gear 15 that is mounted on a vertical shaft 16. Shaft 16 is rotated by a motor 17 which is positioned outside housing 10.

Figure 3:
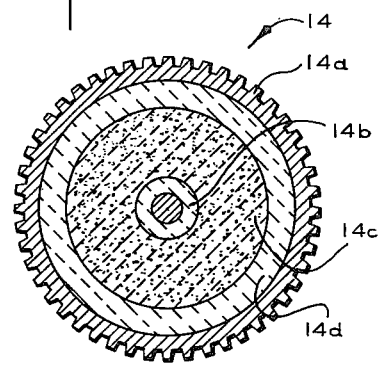
FIGURE 3 is a cross-sectional view of one of the fuel plates employed in the reactor of FIGURE 1.

The construction of fuel plate 14 is illustrated schematically in FIGURE 3. In one specific embodiment of the reactor of this invention, this fuel plate has a diameter of 27¼ inches and a thickness of 0.15 inch. The inner section 14b which extends outwardly to a radius of 3 inches is constructed entirely of beryllium oxide, a neutron moderator. The composition of the next section 14c which extends between a radius of 3 inches and a radius of 10⅝ inches is formed of 15 parts by volume beryllium oxide to one part of high enriched uranium oxide ($U^{235}O_2$), intimately mixed. A 2-inch wide peripheral shell 14d of beryllium oxide insulates the stainless steel gear 14a from the fuel zone.

As illustrated in FIGURES 1 and 2, fuel plate 14 is completely surrounded by a moderator plate 20 which is formed of beryllium oxide. Plate 20 is of substantially the same thickness as fuel plate 14.

A second fuel plate 21 is positioned beneath plate 14 so as to be rotated about rod 13 by a second motor, not shown, which rotates a drive shaft 22. Plate 21 is identical to plate 14 and is surrounded by a moderator plate 23 which is identical to moderator plate 20. A third fuel plate 24 is positioned beneath plate 21 so as to be rotated about rod 12 by a third motor, not shown, which rotates a drive shaft 25. Plate 24 is identical to plate 14 and is surrounded by a moderator plate 26 which is identical to moderator plate 20. In the illustrated reactor, there are a total of 100 fuel plates positioned within housing 10. Proceeding downwardly through the reactor, these plates are alternately rotated about rods 11, 13 and 12. The support rods are positioned so that the area 27 of the triple intersection of the fuel-bearing area of three adjacent plates is about one-tenth of the total lateral area of fuel in any one of the plates. The total lateral area of fuel in any one plate is about 328 square inches, whereas the area of the triple intersection of fuel is approximately 30 square inches. The 100 fuel plates provide a total of approximately 45 kilograms of $U^{235}$ in the reactor. The fuel plates are rotated at speeds of approximately 10 revolutions per minutes.

Immediately surrounding housing 10 is a thermal shield which comprises a total of 6 inches of steel. This total thickness is made up of four individual plates 30, 31, 32 and 33 of thicknesses ½", 1", 1¾" and 2¾", respectively. Plate 30 is spaced one inch from housing 10 and the remaining plates are spaced one inch from one another. This thermal shield is surrounded by a high density concrete biological shield 35 which is approximately five feet thick.

Figure 4:
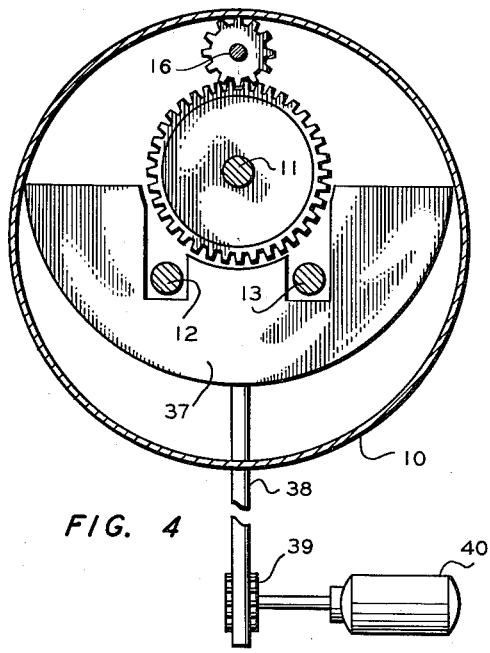
FIGURE 4 illustrates one of the control plates employed in the reactor of FIGURE 1.

The control system of the reactor comprises three safety control plates, four shim control plates and one regulating rod. Counting downwardly from the top of the reactor, the plates numbered 12, 24, 36, 48, 60, 75 and 87 are surrounded by metal containers 37, see FIGURE 4, which receive half-moon-shape plates of boron-nickel or other suitable material which has a high capture cross-section for neutrons. This assembly is attached to a rod 38 which extends outwardly through the reactor housing and surrounding shields. The outer end of rod 38 is provided with a rack that meshes with a gear 39 which can be rotated by a motor 40 to provide the desired control because rotation of gear 39 results in container 37 being moved inwardly or outwardly with respect to the fuel plate it surrounds. This control plate replaces the moderator plate which surrounds the other fuel plates. The control plates at positions 24, 48 and 75 are fully withdrawn during operation and serve as the safety plates. The positions of the remaining four control plates are adjusted during operation of the reactor to achieve close reactivity control. The fine reactivity control is provided by a regulating rod 28 which is constructed of boron-nickel or other suitable material. Rod 28 is positioned above and parallel to the top fuel plate 14 in the reactor. Rod 28 extends outwardly through the reactor shell and the surrounding shields and terminates in a rack 41 at its outer end. Rack 41 is moved by a gear 42 to adjust the distance control rod 28 extends into the reaction zone.

Figure 5:
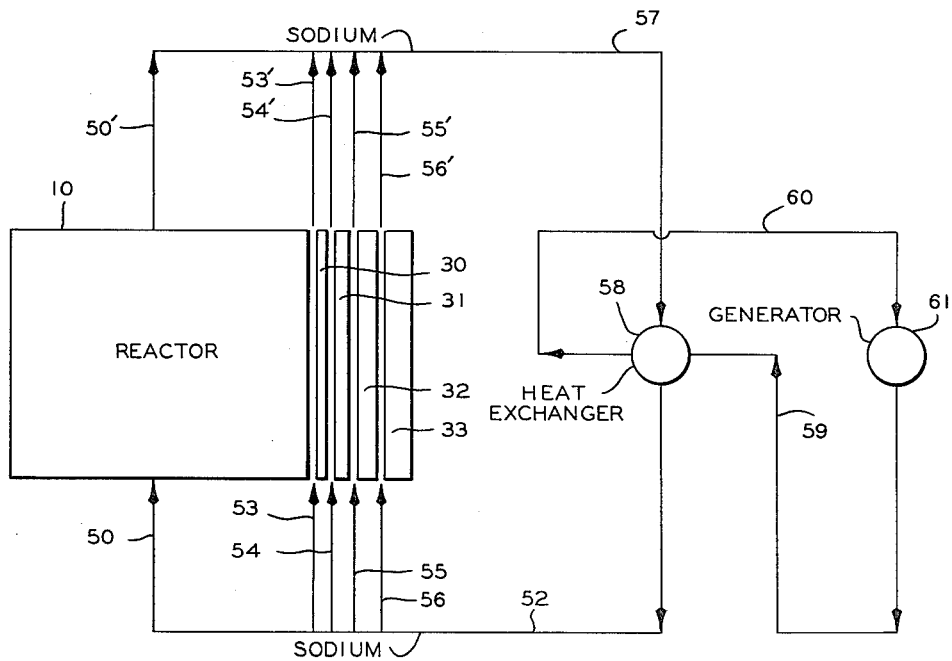
FIGURE 5 is a schematical representation of the reactor coolant flow system.

In the example thus far described, liquid sodium is employed as the reactant coolant. This material is introduced into the bottom of housing 10 through a conduit 50, flows upwardly in a tortuous path between the fuel plates and surrounding moderator plates, and is removed from the top of housing 10 through an outlet conduit 50'. It should be evident that the maximum temperature in the reactor occurs in the reaction zone 27 where the fuel plates overlap. A substantial portion of the heat produced in this zone is carried outwardly by the rotating fuel plates and is removed by the coolant which circulates adjacent these fuel plates. The liquid sodium coolant is directed to the reactor through an inlet conduit 52, as shown in FIGURE 5. Branch conduits 53, 54, 55 and 56 extend from conduit 52 to introduce portions of the coolant through the spaces between the steel plates which surround reactor housing 10. The coolant which flows through these annular zones is removed by conduits 53', 54', 55' and 56' which communicate with common conduit 57, as does outlet conduit 51. Conduit 57 communicates with the first inlet of a heat exchanger 58, the corresponding outlet of which communicates with conduit 52.

A second heat exchange fluid, which also can be liquid sodium, is directed to the second inlet of heat exchanger 58 through a conduit 59 and is removed through a conduit 60. Conduit 60 conveys this fluid to the inlet of a conventional steam generating plant 61. The fluid removed from plant 61 is returned to heat exchanger 58 through conduit 59. Generator 61 can also represent any other means, such as a chemical reactor, wherein it is desired to supply heat.

In the described example the rate of circulation of the primary coolant is 1100 gallons per minute. The temperatures of this coolant at the reactor inlets and outlets are 700 and 1200° F., respectively. The temperatures of the secondary coolant at the inlet and outlet of heat exchanger 59 are 630 and 1130° F., respectively. The rate of circulation of the secondary coolant is 1100 gallons per minute. It should be evident that other types of heat exchanger fluids can be employed, if desired. Alloys of sodium and potassium can be utilized to advantage. The intermediate heat exchanger 58 is provided to eliminate the hazard which would exist if radioactive sodium were circulated directly to the steam generating system. In view of the use of this intermediate heat exchanger, no cladding of the fuel plates to prevent the escape of fission products is necessary. If the intermediate heat exchanger is not employed, cladding of the fuel plates becomes desirable and can be accomplished by positioning a layer of beryllium oxide without uranium oxide on approximately the first 0.005 inch of the faces of the fuel plates.

Figure 6:
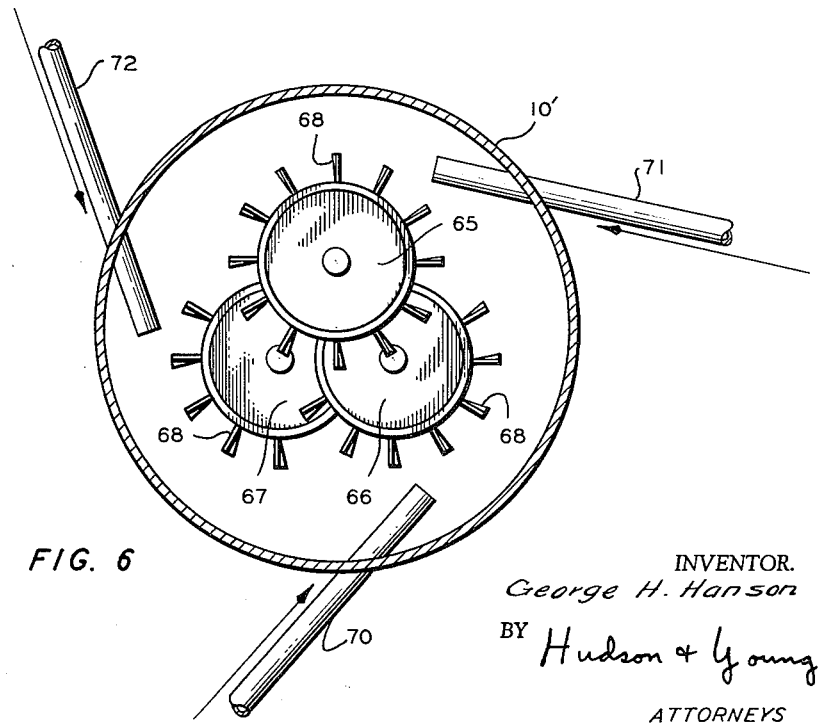
FIGURE 6 is a schematic representation of a second embodiment of the reactor of this invention.

In FIGURE 6 there is shown a schematic representation of a modified form of the nuclear reactor of this invention. This reactor is generally similar to the one previously described except that rotation of the fuel plates is accomplished by the coolant rather than an external drive mechanism. In this second embodiment, three of the fuel plates 65, 66 and 67 are provided with disks 68 in the periphery thereof. The coolant is introduced into housing 10' through a plurality of conduits 70, 71 and 72 in directions to impinge on disks 68. The force exerted by the coolant being introduced into the system results in rotation of the fuel plates. The reactor of FIGURE 6 is otherwise generally similar to the reactor illustrated in FIGURES 1 and 2.

In view of the foregoing description, it should be evident that there is provided in accordance with this invention a novel nuclear reactor which provides efficient heat exchange between the central reaction zone and the coolant medium circulated through the reactor. The operation time of this reactor using a given charge of fuel is relatively long and the control system is relatively simple.

While the invention has been described in conjunction with present preferred embodiments, it should be evident that it is not limited thereto.

What is claimed is:

1. A nuclear reactor comprising a generally cylindrical housing; three support rods positioned within said housing in parallel relationship with the axis of said housing and in spaced relationship with one another to form the corners of an equilateral triangle in a plane perpendicular to the axis of said housing; a plurality of first circular plates positioned in spaced relationship with one another within said housing coaxial with and surrounding the first of said support rods; a plurality of second circular plates positioned in spaced relationship with one another within said housing coaxial with and surrounding the second of said support rods; a plurality of third circular plates positioned in spaced relationship with one another within said housing coaxial with and surrounding the third of said support rods; said first, second and third plates being positioned alternately in a direction parallel to the axis of said housing, said plates being spaced from one another and being of such size as to overlap at the center of said housing; means to rotate said first, second and third plates about said first, second and third support rods, respectively; plates of neutron moderator material enclosing said first, second and third plates; said first, second and third plates being formed at least in part of fissionable material so that said overlapping sections form a critical mass to sustain a nuclear reaction; at least one control element of a neutron absorbing material adjustably positioned within said housing; and means to circulate a coolant through said housing so that said coolant is in continuous heat exchange relationship with said first, second and third plates.

2. The reactor of claim 1 further comprising a thermal shield formed of a plurality of concentric spaced plates surrounding said housing, and means to circulate a coolant between said plates.

3. The reactor of claim 1 wherein at least one of each of said first, second and third plates is provided with a plurality of disks at the periphery thereof further comprising means to introduce at least part of said coolant into said housing in directions tangential to said circular plates to impinge on the disks thereof, thereby forming said means to rotate.

4. A nuclear reactor comprising a generally cylindrical housing; three support rods positioned within said housing in parallel relationship with the axis of said housing and in spaced relationship with one another to form the corners of an equilateral triangle in a plane perpendicular to the axis of said housing; a plurality of first circular plates positioned in spaced relationship with one another within said housing coaxial with and surrounding the first of said support rods; a plurality of second circular plates positioned in spaced relationship with one another within said housing coaxial with and surrounding the second of said support rods; a plurality of third circular plates positioned in spaced relationship with one another within said housing coaxial with and surrounding the third of said support rods; said first, second and third plates being positioned alternately in a direction parallel to the axis of said housing, said plates being spaced from one another and being of such size as to overlap at the center of said housing; means to rotate said first, second and third plates about said first, second and third support rods, respectively; plates of neutron moderator material positioned adjacent said first, second and third plates; a control plate of neutron absorbing material positioned adjacent one of said circular plates; means to move said control plate toward and away from the circular plate it is positioned adjacent to; said first, second and third plates being formed at least in part of fissionable material so that said overlapping sections form a critical mass to sustain a nuclear reaction; a control rod of neutron absorbing material extending into said housing adjacent said first, second and third plates; means to move said control rod toward and away from said first, second and third plates; and means to circulate a coolant through said housing so that said coolant is in continuous heat exchange relationship with said first, second and third plates.

5. The reactor of claim 4 wherein said first, second and third plates are each formed of a center core of neutron moderating material which is surrounded by a ring of fissionable material which is surrounded by a ring of neutron moderating material, said plates being positioned so that the overlapping section includes said fissionable material.

References Cited in the file of this patent

UNITED STATES PATENTS

| | | |
|---|---|---|
| 2,812,304 | Wheeler | Nov. 5, 1957 |
| 2,852,458 | Dietrich | Sept. 16, 1958 |
| 2,865,826 | Stewart | Dec. 23, 1958 |

OTHER REFERENCES

Nucleonics, vol. 13, No. 6, June 1955, p. 59.